United States Patent [19]

Arnold

[11] 4,333,265
[45] Jun. 8, 1982

[54] AIR DROP PLANTING SYSTEM AND IMPROVED PLANTING DEVICE FOR SAME

[76] Inventor: Richard L. Arnold, P.O. Box 3276, Reno, Nev. 89505

[21] Appl. No.: 129,925

[22] Filed: Mar. 13, 1980

[51] Int. Cl.³ .............................................. A01G 23/02
[52] U.S. Cl. .......................................... 47/74; 111/1; 206/423; 221/92; 414/417
[58] Field of Search ......................... 47/73, 74, 77, 84; 111/1-3; 193/44, 46, 1; 221/305, 87, 88, 94, 92, 103, 123, 185, 269, 270, 74, 95, 98-100, 109, 110, 268, 312 C; 414/417; 206/422, 423, 538, 3, 564; 220/3 E; 229/19, 20; 89/65 A; 312/35, 42, 45, 71

[56] References Cited

U.S. PATENT DOCUMENTS

| | | | |
|---|---|---|---|
| 1,291,420 | 1/1919 | Cough | 312/45 X |
| 2,237,712 | 4/1941 | Mullins | 312/45 X |
| 2,379,383 | 6/1945 | Steel | 206/3 X |
| 2,499,652 | 3/1950 | Kirby | 221/185 |
| 2,592,052 | 4/1952 | McKenna | 111/1 |
| 2,893,167 | 7/1959 | Davidson | 47/73 |
| 3,174,940 | 3/1965 | Lacoste | 47/66 X |
| 3,273,284 | 9/1966 | Anagnostou | 47/74 |
| 3,479,796 | 11/1969 | Blunt | 206/3 |
| 3,755,962 | 9/1973 | Walters et al. | 47/66 |
| 3,798,837 | 3/1974 | Oehmke | 47/77 |
| 3,881,633 | 5/1975 | Bradt | 221/123 |
| 4,047,329 | 9/1977 | Holt | 47/74 |

FOREIGN PATENT DOCUMENTS

| | | | |
|---|---|---|---|
| 957207 | 11/1974 | Canada | 47/74 |
| 2735225 | 6/1975 | Fed. Rep. of Germany | 47/73 |
| 409290 | 9/1966 | Switzerland | 206/564 |

Primary Examiner—James R. Feyrer
Attorney, Agent, or Firm—Sughrue, Mion, Zinn, Macpeak and Seas

[57] ABSTRACT

A helicopter mounts special dispensing containers, the dispensing containers supporting racks for stacking planting device transport and dispensing trays within which a series of planting devices are nested for discharge at an open end thereof. The planting devices constitute composite multi-section molded hollow cone bodies of powder molded urea-formaldehyde resin including one nutrient enriched section or band at the seedling side root area, the bodies carrying internally, a compacted growing medium within which is positioned a seedling either grown therein or transplanted therein. The bodies may bear a molded nose cone and may also bear by way of a collar, a propelling wing to increase the drive velocity of the body for forced penetration of the earth formation being planted. The individual planting devices are pushed from the planting device transport and dispensing trays at a rate depending upon the helicopter speed, altitude and planting density desired.

5 Claims, 11 Drawing Figures

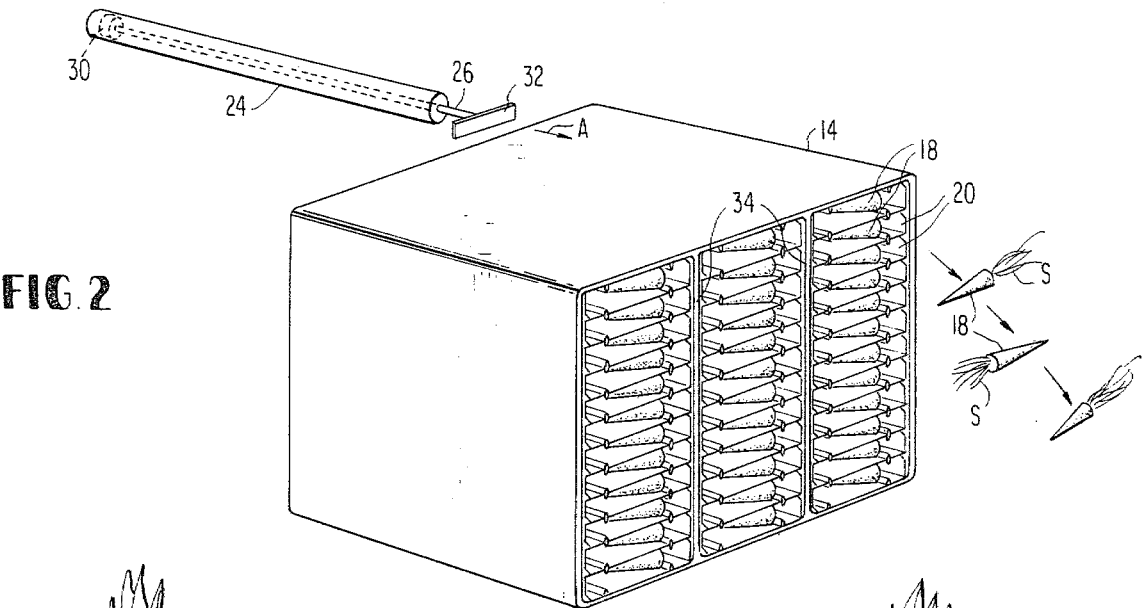
FIG. 2
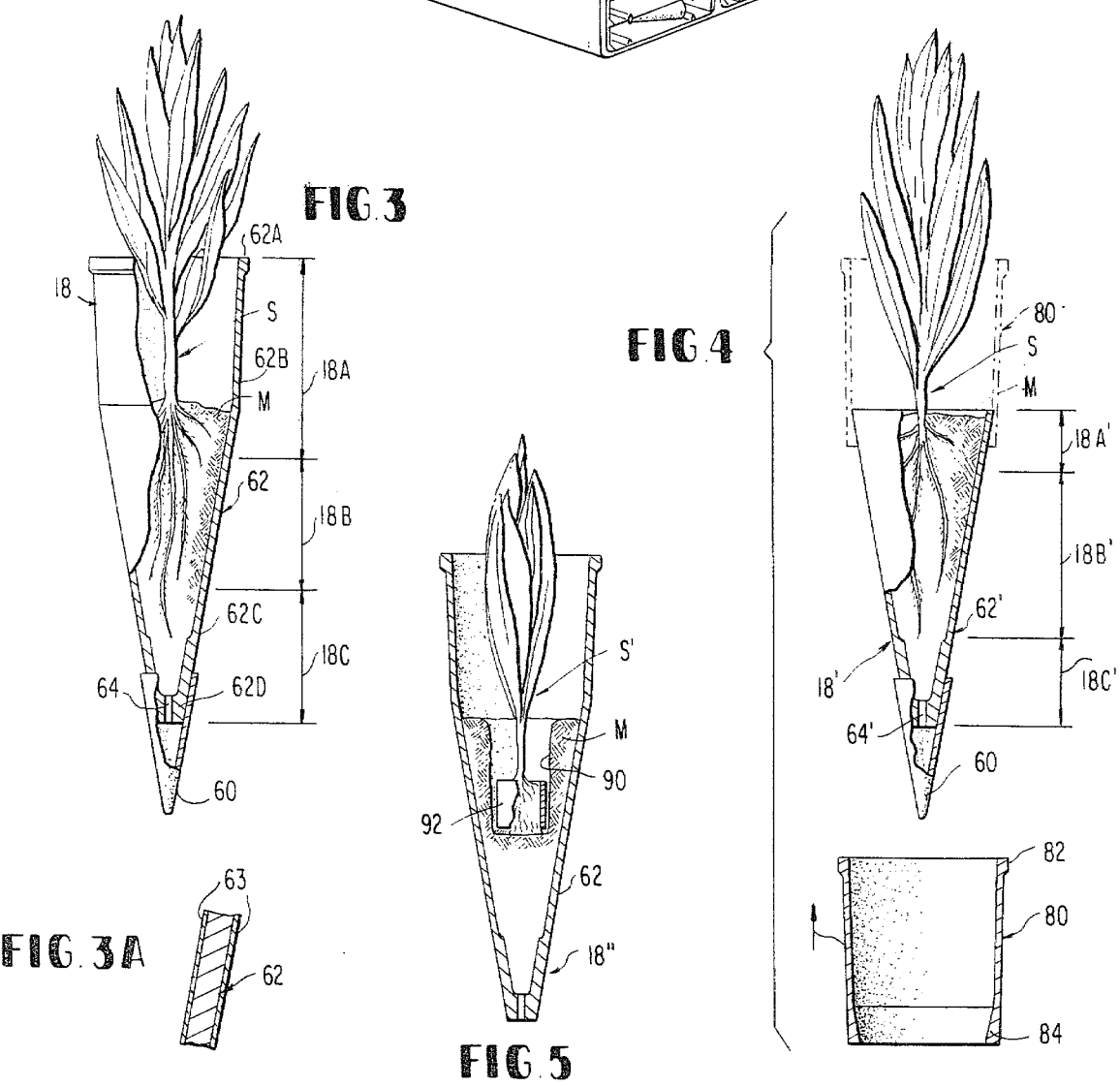
FIG. 3
FIG. 3A
FIG. 4
FIG. 5

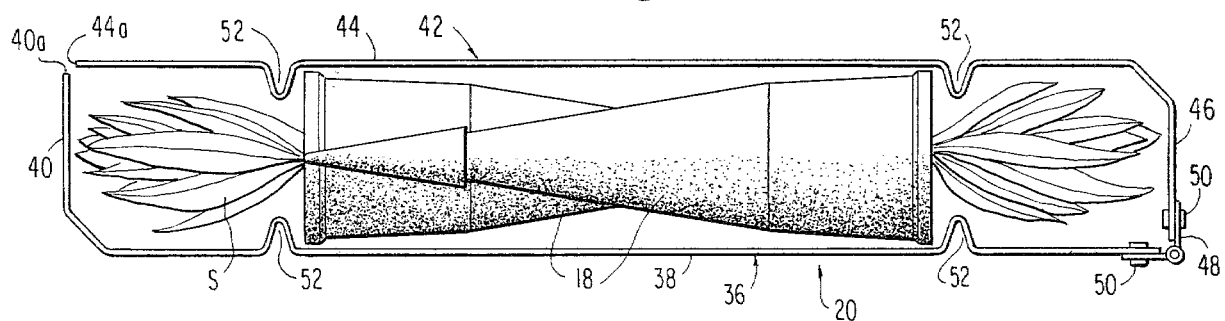
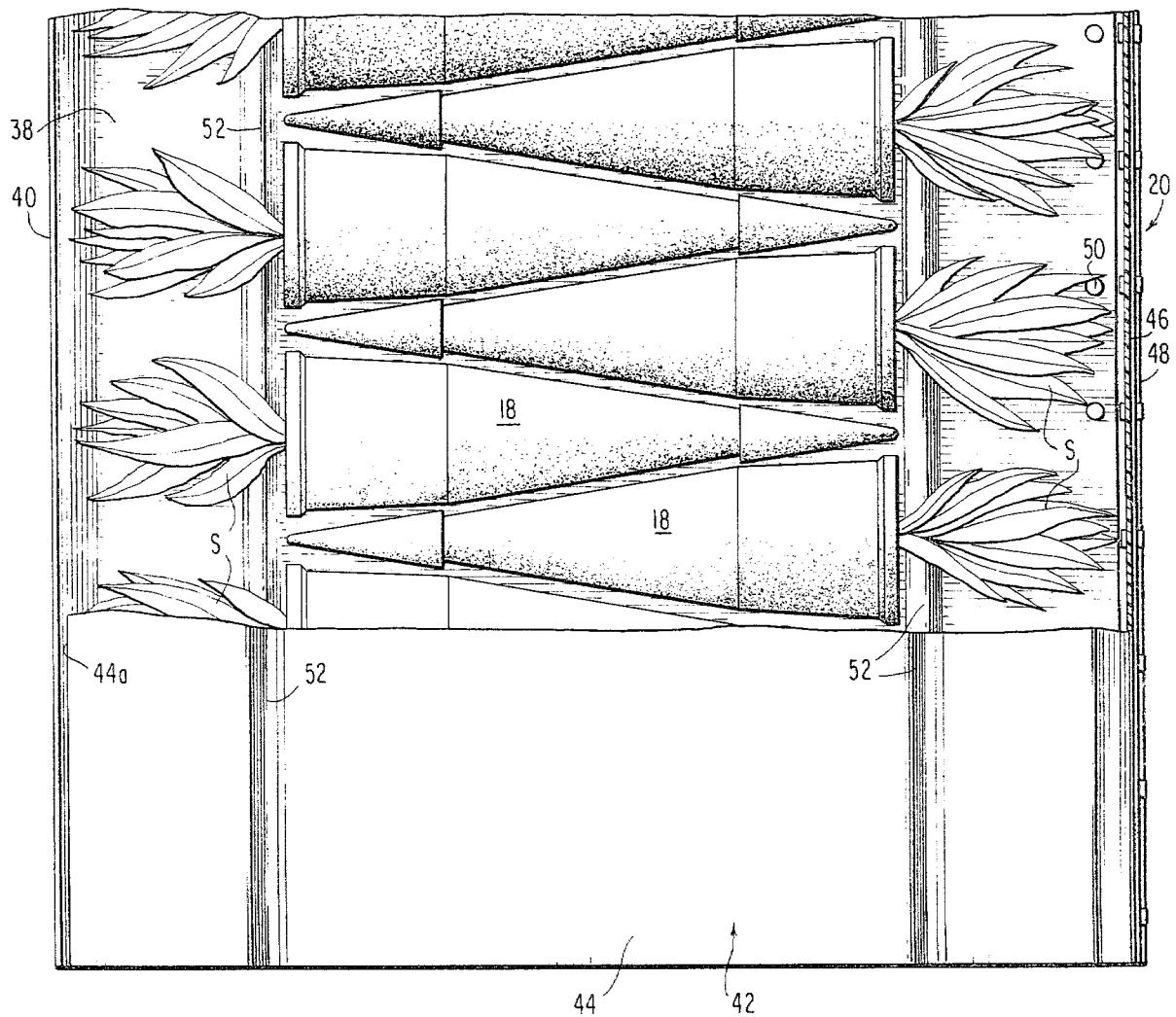

AIR DROP PLANTING SYSTEM AND IMPROVED PLANTING DEVICE FOR SAME

FIELD OF THE INVENTION

This invention relates to an air drop planting system and more particularly to an improved airborne air drop planting system in which a plurality of improved hollow conical planting devices are dropped from a helicopter or other aircraft to achieve a random planting pattern in an underlying earth formation.

BACKGROUND OF THE INVENTION

Attempts have previously been made to plant seeds or seedlings by dropping containers which contain the seeds or seedlings from an aircraft. The planting containers may bear fins for aerodynamic stability and a pointed nose for penetrating the soil and also may have wall portions penetratable by the roots of the seedling; the containers may be dropped by low altitude aircraft such as helicopters. U.S. Pat. No. 3,755,962 issuing Sept. 4, 1973, to John Walters et al. and entitled "Aerial Planting Method and Apparatus" discloses one form of an air drop planting system incorporating the features mentioned above.

Such planting devices constitute a hollow containers, the interiors of which are provided with a suitable growing medium; because of the aerodynamic design of the containers, and due to the influence of gravity, the containers fall nose first, and penetrate the soil to plant the seed or seedling.

Further, attempts have been made to incorporate within such airborne planting device means to promote growth. In U.S. Pat. No. 3,273,284 issuing Sept. 20, 1966, to G. N. Anagnostou and entitled "Planting Container", a container is provided which is made of a material which disintegrates upon exposure to water and is formed in part from fertilizers and pulp, with the lower end of the receptacle being weighted with iron pellets to assure nose first air drop. A water filled membrane is provided to cushion the root system of the tree seedling and to supplement the natural water supply. Thus, the planting container of the latter patent is employed in a fed versus a non-fed transplant device which distinguishes this device from that of U.S. Pat. No. 3,755,962.

Applicant has determined that the planting container of Anagnostou, while constituting an important element in a fed transplant system, is not the complete solution to the problem, since most foresters have learned to avoid conventional water soluble starter fertilizers because of the inherent danger to seedlings. The risk of burning roots is great; measuring and mixing the conventional water soluble starter fertilizers with the soil is time consuming and the effects are short lived.

Most all replanting projects are usually on cutover timber land, land strip mined for coal or oil shale, abandoned row crop or pasture land, etc. On such soils, transplants must struggle for years until (and if) they can crowd out the vigorous brush and weeds which compete with them for water, sun and plant nutrients. One or more spot replantings are par for the course to replace the seedlings that never took or which were overwhelmed by weeds or brush.

In the field of land reclamation, seedling trees face an unfavorable, even hostile environment. Soil is often so coarse that suitable fertilizers leach away before the plants get much good from them or the soil is so acid or alkaline that soil chemicals fix (lock up) nutrients in forms that are unfavorable for planting. Land reclamation crews are understandably reluctant to carry around heavy bags of granular fertilizer and measure and mix it with backfill in the normal transplanting process due to the weight of the fertilizer and the nuisance in dealing with it.

There has been developed an organic nitrogen fertilizer which is acted upon by soil bacteria to provide timed release of the approximately 38 percent total nitrogen content of that fertilizer, of which from about 24-28 percent is water insoluble and the balance is soluble only in large amounts of water. This organic nitrogen fertilizer, known as ureaform, is commercially available under the registered trademark NITROFORM by Boots Hercules Agrochemicals Company of Wilmington, Del. The ureaform is composed of a series of low solubility and water-insoluble carbon-nitrogen units known as methyleneureas and is achieved by the reaction of formaldehyde with urea under controlled conditions and in prescribed proportion. Under reaction, a complex of methyleneurea molecules of varying molecular weight are produced. The commercial product, which is available in either a fine powder or particulate form, permits nitrogen release by soil bacteria similar to that occurring from natural organic fertilizers. Bacteria initially acts to release available nitrogen by breaking down the more soluble shorter chain, low molecular weight molecules over a relatively short period of four to six weeks, depending upon soil temperature. Within the ureaform, the intermediate-length methyleneurea molecules being soluble in hot water only, require more time for conversion to available nitrogen, for instance, over six months of the growing season. The longer chain molecules are insoluble in hot water and are more slowly converted. Thus, the ureaform constitutes a soil bacteria degradable polymeric material which makes nitrogen available in a controlled release fashion.

It is, therefore, a primary object of the present invention to provide an improved air drop planting system and planting device for the same in which the air drop planting device bearing a seed or seedling incorporates within the device body nutrients for supporting plant growth over an extended period of time whose release is responsive to soil bacteria action, which body material is non-water soluble, and in which the risk of root burning is eliminated.

It is a further object of the present invention to provide an improved air drop planting system and planting device in which a hollow cone body is formed of a soil bacteria degradable pressed powder material including a localized zone bearing nutrients and surrounding the area of the side roots of the internally carried plant.

It is a further object of the present invention to provide an improved air drop planting device in which the compounding of the hollow cone body material, the growing medium density, the nose cone construction, the roughness of the outer surface of the body and its center of gravity combine to achieve necessary aerodynamic stability of the air drop planting device, without requiring added stability structure to the hollow cone body.

Another object is to provide an air drop planting device and process whereby the seed or seedling container is especially designed to penetrate the soil due to the influence of the down draft of the propeller of the aircraft from which the container is dropped.

SUMMARY OF THE INVENTION

The improved air drop planting device of the present invention is formed from a water insoluble material which is degradable in the presence of soil bacteria. The material may be any suitable material which is capable of being formed into a device of the desired structure having sufficient mechanical strength, and having the property of being degraded in the presence of soil bacteria into components which are compatible with the establishment and growth of the plant material contained therein. The most useful materials are water insoluble polymers which are attacked and degraded by soil bacteria and are amenable to formation by molding or other techniques into self supporting shapes suited to the intended use. One preferred material is urea-formaldehyde resin, i.e. ureaform. The device may be formed by compressing powdered or granulated ureaform resin into a unit including multiple compressed powder bands or sections with one band, in the vicinity of the side root area of the seedling, containing additional nutrients which are released when the polymer is degraded by soil bacteria action. The preferred urea-formaldehyde resin material itself, absent additional nutrients, releases all of the nitrogen required by the seedling. Preferably, the hollow body is cone shaped and has configurational characteristics and outer surface properties such that it is in itself an aero-dynamically stable body and thus insures point-first impact for proper positioning of the seedling borne by the body.

The hollow urea-formaldehyde resin body may be employed before air drop in growing the seedling to planting size; preferably the body contains within it a sterile loam in which the seed is planted; the resin body additionally is preferably covered with a suitable thin coating of material, such as, paraffin to retard attack of the urea-formaldehyde resin by bacteria during the initial growth of the seedling after germination. The coating itself may be biodegradable in the presence of soil bacteria and thus will serve as a control over the degradation of the walls of the device. By controlling the thickness of and selecting the proper material for the coating the attack on the structure of the device can be delayed, i.e., for six or seven months at which time the seedling is adequately nourished by the nutrients available in the device.

The cone-shaped body may include an attachable cuff of any suitable material, such as, styrofoam, degradable polyethylene, etc which functions as a shroud for the leaf portion of the seedling which projects from the loam during the high velocity air drop. The cone-shaped body may further include a shroud or cuff formed of the same urea-formaldehyde resin which makes up the main portion of the body. A band bearing radial driver air foils at a preferred pitch may be slipped onto the outside of the cone and positioned near the top to function as a driving wing assembly.

A hinged tray bearing internal projections permits the hollow cone urea-formaldehyde resin compressed powder bodies to be nested with the cone points of adjacent bodies pointing in opposite directions; the trays may be stackable within a dispensing container which opens at one side and may be mounted to the side of an aircraft so that the individual planting devices may be projected out of the trays to effect a random planting pattern over a closely controlled ground swath.

BRIEF DESCRIPTION OF THE DRAWINGS

FIG. 2 is an enlarged perspective view of one of the special dispensing containers which is helicopter mounted in FIG. 1, and which in turn bears a plurality of stacked transport containers, each bearing a horizontal series of improved hollow cone planting devices of the present invention.

FIG. 3 is a vertical elevational view, partially cut away, of one form of the improved planting device of the present invention bearing a seed grown plant.

FIG. 3A is an enlarged fragmentary sectional view of a portion of the wall of the hollow conical body of FIG. 3 showing internal and external coatings on the wall.

FIG. 4 is an exploded vertical elevational view of a second embodiment of the air drop planting device.

FIG. 5 is a vertical elevational view, partially cut away of yet a third embodiment of a hollow cone planting device of the present invention.

FIG. 9 is a top plan view, partially broken away, of a portion of a planting device transport and dispensing tray for mounting with the transport container of FIG. 2.

FIG. 10 is an end view of the planting device transport and dispensing tray of FIG. 9.

DESCRIPTION OF THE PREFERRED EMBODIMENTS

Figure 1:
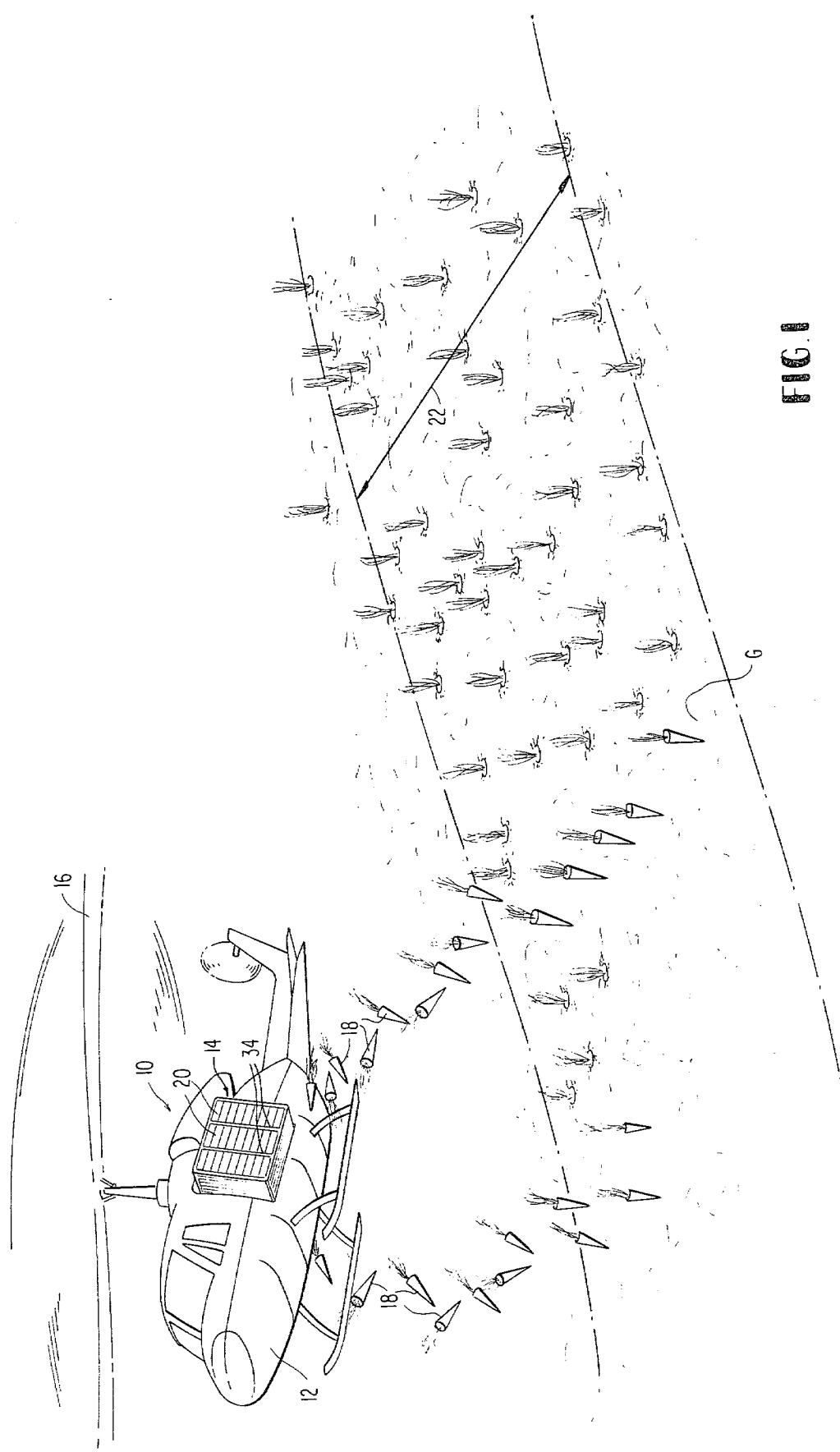
FIG. 1 is a perspective view of the improved air drop planting system of the present invention in which a helicopter is employed in air dropping a plurality of the improved planting devices in a random planting pattern.

Referring to FIG. 1, the air drop planting system of the present invention is preferably achieved by utilization of a helicopter or like low altitude aircraft as at 10, such as a H14 or H19 Bell helicopter. Mounted on opposite sides of the helicopter body 12 are a pair of special planting device dispensing containers indicated generally at 14 which are shown in action as dispensing improved planting devices 18 of the present invention on both sides of the aircraft for gravity and forced air drop (due to the propeller wash of helicopter primary blade 16 pitch). Satisfactory drop of the containers illustrated in this application and penetration of the containers into ground is generally achieved when the drop is made from a helicopter operating, e.g., at 55-62 knots air speed and an altitude of 65-85 ft. with the propeller pitch adjusted to provide a downdraft. Additionally, the belly of the helicopter may bear another special dispensing container 14.

The planting devices 18 form projectiles which emanate from each side of the helicopter. On each side, there are two distinct patterns, since the devices 18 alternate in terms of their nose direction in their lateral side by side nesting within individual planting devices transport and dispensing containers or trays, indicated generally at 20. The containers or trays 20 are stacked vertically and mounted in rows within the special dispensing containers 14. As the devices 18 are forcibly pushed out of the transport and dispensing containers 20, they tend to overlap slightly with those falling out of the opposite side of the aircraft special dispensing container. Depending upon the altitude and speed of the aircraft, the planting pattern within earth formation ground G is widened and narrowed and its density is increased or decreased. However, there is a random planting pattern effected as indicated in FIG. 1 of a given swath width, as indicated by the double headed arrow 22.

Turning to FIG. 2, the air drop dispensing system includes as a basic component the special dispensing container 14 mounted to the side of the aircraft body and opening at one end internally of the aircraft. Incorporate in the interior of the aircraft fusilage or forming part of the special dispensing container 14 are pneumatic cylinders or the like 24 bearing plungers or rods 26 which project through one end of the cylinders. The rod may be connected internally to a piston 30 and may bear on its outboard end a pusher blade as at 32. Each of the planting device transport and dispensing containers or trays 20 which form side-by-side vertically stacked arrays within the special dispensing containers 14 have operatively aligned therewith a pusher blade 32, either by shifting cylinder 24 or by providing for each of the transport and dispensing containers 20, a cylinder 24 which remains fixed and which is in horizontal alignment therewith. By projecting the blades 32, in the direction of arrow A the planting devices 18 are forcibly projected through the open vertical end wall of the transport and dispensing trays 20. Container 14 is very much like an igloo used by the air freight industry to hold luggage or freight. However, the special dispensing container 14 bears transport and dispensing trays 20 which are of elongated generally rectangular form. The special dispensing containers 14 receive the planting device transport and dispensing trays 20 in the field, while in turn the transport and dispensing trays 20 are loaded in the nursery, where the seedlings are transplanted into the planting devices 18 or grown within the devices. The cubicle or container 14 is basically a square metal box which mounts into the side of the helicopter and bears guides for plastic trays 20. The pneumatic cylinders 20 may constitute an electric air driven plunger system to push the individual hollow cone planting devices 18 out of each of the transport and dispensing containers or trays 20.

The air drop planting system may make use of a guidance system (not shown) which is attached to the pilot's helmet, the pilot using a sight, with planting being effected like a bombing run. The pilot flys over the planting area and, using his guidance system, activates the dispensing system at the proper time to pinpoint the individual hollow cone planting devices within about three feet of the target area. Preferably, the sighting system is operatively coupled with a thumb actuated triggering device which operates the electric controlled air driven plunger system cylinders 24 to eject the planting devices from the trays 20, for example, dropping as many as 60 or 70 devices every three to nine seconds.

In the illustrated embodiment, the special dispensing container 14 is provided with horizontally spaced vertical partition walls 34 forming three side by side compartments, each receiving a plurality of vertically stacked transport and dispensing containers or trays 20.

Referring next to FIGS. 9 and 10, there is shown in detail portions of the elongated planting device transport and dispensing container or tray 20. The transport and dispensing containers or trays 20 may be molded plastic sheet material, e.g., vacuum formed plastic, formed sheet metal or the like, and consist essentially of two hinged segments or halves; a bottom half indicated generally at 36, includes a bottom wall 38 and one integral end wall 40; a top half indicated generally at 42, comprises a top wall 44 and an integral opposite end end wall 46. A simple piano wire hinge 48 may be employed to pivotably connect the bottom half 36 to the top half 42 at one side, the hinge 48 being shown as riveted by way of rivets 50 to respective halves. In the illustrated form of the transport and dispensing tray 20, each of the halves bear internal ram system indentations constituting ribs 52 which oppose each other, inwardly of opposed ends 40 and 46 of the tray 20, the ribs 52 functioning to locate the planting devices which are placed alternately end for end in side-by-side fashion within the container bottom, with the top open. The container is horizontally oriented permitting free access to the interior of the transport and dispensing container or tray 20, with the cover or top pivoted upwardly and rearwardly.

Insofar as the planting devices 18 are concerned, the structural make up and the chemical composition of these devices will be discussed hereinafter. However, the devices 18 in the form shown in FIGS. 9 and 10 bear integral collars at their open ends with the collars bearing on the internal ribs 52, thus locating the planting devices and permitting the leafy ends of the seedlings indicated generally at S to project into the ends of the transport and dispensing containers 20, beyond ribs 52. When the top or cover 44 is closed, it may be latched shut by latch means (not shown) preferably located at the diametrically opposite corner from hinge 48 and at the open edges 40*a* and 44*a* of end wall 40 and top wall 44, respectively.

When in the transport and dispensing mode, the devices are laid over in horizontal position with adjacent devices pointing in opposite directions. Thus, when ejected from of the container, the direction in which they lay indicates the start of the flight and creates a desired swath effect. The arrangement and the nature of the fall is somewhat critical due to the center of gravity factor. Applicant has ascertained that if they are all placed in one direction, the resulting pattern is not uniform and the devices themselves are hard to push out of their transport and dispensing containers or trays 20. It has been ascertained that because the center of gravity tends to pull the devices away from the point of initial discharge from the container 14 and may pull the devices over 12 feet in either direction, it is possible to lay down a 50 foot wide swath. It is also possible to pinpoint the drop within three feet of a target. Openings may be provided within the ends of the transport and dispensing containers or trays 20 to permit watering the seedlings in place so that the seedlings may be stored for several days if necessary on pallets sitting out in the forest prior to planting, without adverse effects.

A principle aspect of the present invention resides in the structural make up and the chemical composition of the planting bodies forming the devices. A typical planting device 18 employed in FIGS. 9 and 10, is shown in more detail in FIG. 3. The hollow cone planting device, indicated generally at 18, constitutes one form of which the planting device of the present invention. The body of the device may be made from any water insoluble, soil bacteria degradable material capable of being formed to the desired shape and having the necessary mechanical strength. In one preferred embodiment the hollow cone planting device 18 has a body molded from compressed resin powder, generally indicated at 62, of unitary construction and may include a separate molded nose cone 60. The molded nose cone may be alternatively formed of a molded plastic such as nylon. Alternatively, the body 62 may form the only component of the planting device 18 other than the seedling and the soil or loam internally of that hollow body. The dimensions of body 62 and nose cone 60 may vary for different applications.

The illustrated planting devices of the present invention are generally about twelve inches in length and about three inches in outside diameter at the open top of the cone-shaped bodies 62. In terms of configuration, at the top or open end of the body 62, there is formed a radially enlarged rim or collar 62A and intergrally a side wall or shroud 62B. Shroud 62B bears a slight taper and extends over approximately one-third of the vertical height of body 62. The shroud 62B merges into a major cone portion 62C which terminates at its lower end in a relatively thick tip portion 62D. The tip portion 62D bears a small diameter axial drainage hole 64. Preferably, body 62 and nose cone 60 are molded out of 100 percent of a water insoluble urea formaldehyde resin which is an inert material. This material may of course be blended with other polymers or may be mixed with organic or inorganic extenders or fillers as is well known in the art. It is important to form body 62 of a material having the proper chemical content or pH factor such that it may exist for up to two or three years without complete soil bacteria degrading for controlled release of nutrients regardless of the material from which it is formed. In the illustrated embodiments within this application, the approximate weight of the planting device 18 is one and one-half pounds. There is no ballasting or weighting required, no inclusion of metal pellets as in U.S. Pat. No. 3,273,284. Further, the design is aerodynamically stable. When ejected from the dispensing containers 20, a planting device 18 falls under gravity and forced air influence due to the pitch of the blades 16 of the propeller of the helicopter, nose first and upon impact projects into the earth's surface to a depth determined by several factors. There are no requirements for fins or vanes to stabilize the planting device and it is thus self-stabilized. However, as may be seen hereinafter, air foil type wings may be employed for effecting increased velocity and spin to the projectile like device 18, and therefore, increased penetration into the earth surface due to the boring effect which is imparted to the devices, thus making the invention particularly useful for planting in a relatively hard ground formation. For instance, planting may be required in a heavy clay area, such as is found in the Pacific Northwest and coastal regions of Oregon, Washington, Canada and California. By utilizing the prop wash from the aircraft or the blades of the helicopter, the downdraft created by rotation of the helicopter blade pitch and by use of an air foil on each device, one can multiply the wind speed by a factor of two such that if the devices are dumped out of the door of a helicopter moving at 55 knots, their velocity may be increased at the moment of projection into the ground to a speed of over 110 knots. It is desirable to maintain implantation to a depth from four to six inches. Further, it is preferable that the body 62 be fractured to some extend at impact such that as the seedling grows, the root structure may penetrate the wall of the body 62 (while at the same time soil bacteria are acting on that body to decompose it).

In the FIG. 3 embodiment, the seedling S is grown within body 62, the body 62 being filled to the extent of portion 62C with a growing medium M such as loam. A seed may be placed within the loam, with the seed germinating and seedling S growth taking place, all within a greenhouse prior to airborne planting. Under some conditions it may be preferable to air drop devices containing seeds rather than seedlings. Body 62 comprises, as a unitary band, a nutriment enriched biodegradable molded material section. The body 62 may, for instance, be pressure molded of 100 percent urea-formaldehyde 38-0-0, i.e. ureaform. As may be appreciated by reference to FIG. 3, regardless of the configurational aspects, into which body 62 is divided, e.g., sections or portions 62A, 62B, 62C and 62D, a preferred embodiment of the invention calls for the formation of an integral band or distinct lateral body section which contains nutrients released in response to soil bacterial action on the plastic. In such a case, device 18 may include an upper portion 18A which may be 100 percent urea formaldehyde resin 38-0-0 containing no nutrient additives. 18B is the bacterial action release nutrient enriched section and if a seed is implanted within body 62 rather than a seedling S, the seed is positioned about four inches above the band 18B, that is, the release nutrient section. This section preferably extends down to the tip of the cone, section 18C.

Further, especially where seed are to be planted, and perhaps also in the case of planting seedlings S, it is preferable to coat the cone 62 internally and externally by spraying with or dipping in hot paraffin or similar coating to retard soil bacterial action on the body material. The hot paraffin upon solidification performs two functions. It stops the moisture absorption of the material itself, which would aggravate the bacterial action while the seed is in the germination process. Any time one places non-sterile soil against the material of the hollow cone body 62 degradation is initialed due to bacterial growth action of the root structure and the release of the nitrogen or other nutrients borne by the body 62 is also begun.

The hollow cone body 62 is comprised of a water insoluble, soil bacteria degradable material, such material preferably being polymeric, and specifically a ureaform resin. A suitable ureaform material is manufactured commercially under the trademark NITROFORM by Boots Hercules Agrochemicals Company, as mentioned previously, and the trademark product contains 38 percent total nitrogen 24–28 percent being water insoluble, and the balance only slowly soluble in large volumes of water. The physical and chemical properties of the hollow conical body forming the principal element of the planting device (or sole element) depend principally upon particle size, extent of compaction when formed from pressed powder and density (density effects the rate of solubility and hence of nitrogen release) as well as the molecular weight distribution which correlates directly with solubility and the rate of biological breakdown to available nitrogen. Further, the hollow cone body 62 formed of ureaform or like soil bacteria degradable material may be comprised of multiple layers or integral sections, with a certain section, preferably in the vicinity of the root structure, bearing nutrients which are releasable during the soil bacteria action on the base ureaform material. By coating the body internally and/or externally with approximately 10 to 14 mils of basic household paraffin or like soil bacterial action retardant coating of appropriate thickness, there is a suspension of the bacterial action. Paraffin is also disintegrated through bacterial action, and it has been ascertain that by application of 10 to 14 mils of household paraffin, an approximate seven month period will elapse prior to the paraffin actually being removed from the interior wall. If, for instance, a seed has been placed within the growing medium M (preferably sterilized loam), the loss of the paraffin will be effected at a time when the seed has been germinated, root formation has been achieved and about the time that the seedling S has reached growth permitting it to be planted in the forest for best survival changes. Further, advantageously, the open hollow cone body 62 functions as a physical support for the loam and the initial seed and subsequent seedling growth after germination, both prior to and after air drop in the forest area being planted or replanted. The paraffin coating on the outside also limits, for an additional time period after planting the release of the nutrients to the seedling and prevents loss of nutrients to the brush surrounding the implanted body 62.

Figure 11:
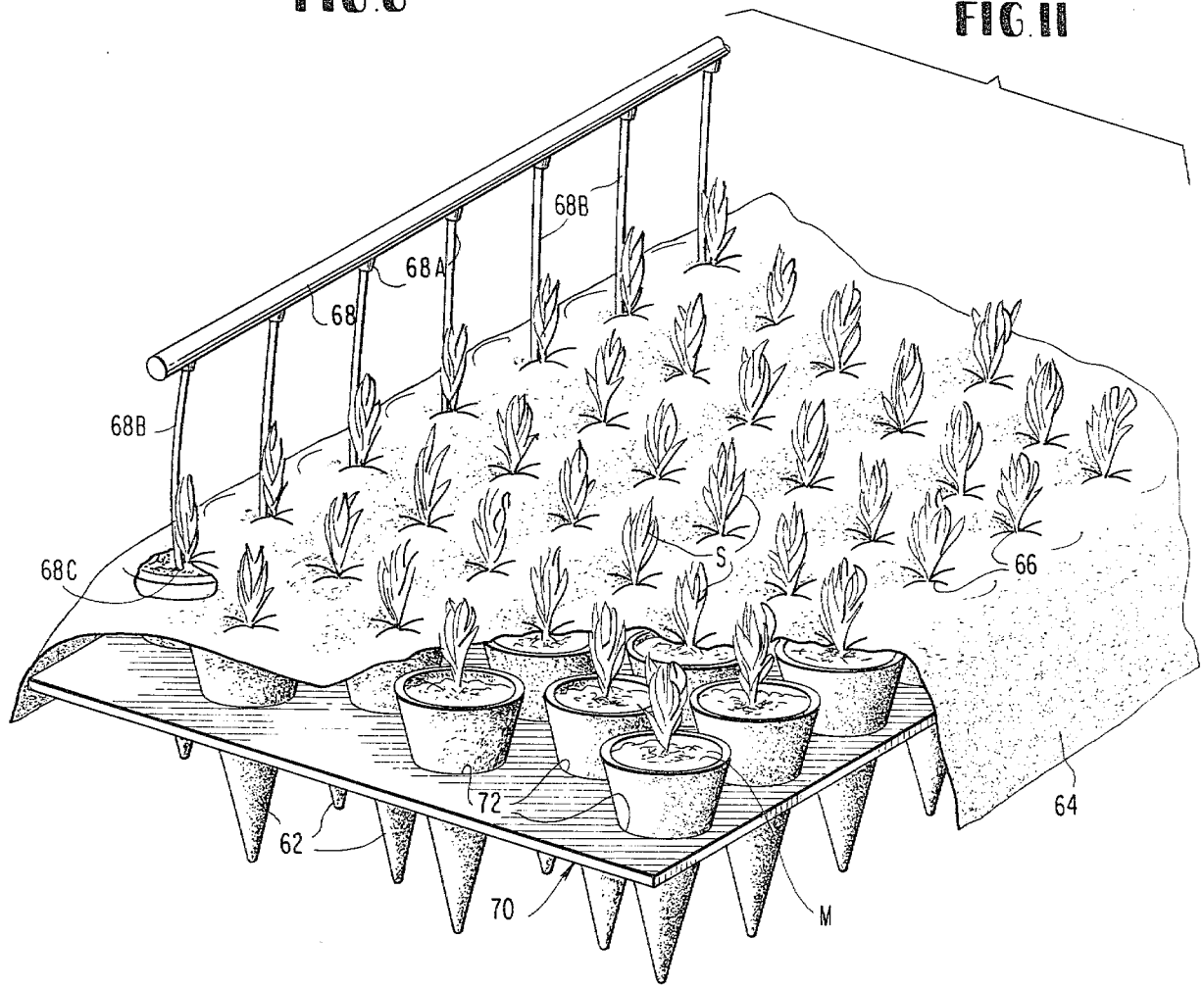
FIG. 11 is a perspective view of a growing tray bearing a plurality of planting devices within which seedlings are being grown prior to airdrop.

In that respect, a plurality of urea-formaldehyde resin bodies 62, FIG. 11, may be mounted within suitable circular holes as at 72 within a growing tray indicated generally at 70, the growing tray 70 consisting of an apertured board or the like and being supported by means (not shown). The planting device bodies 62 in the form of hollow cones are simply dropped into the openings 72 to a position determined by the diameter of the holes 72 with their open ends facing upwardly and bearing the seeds. The tray 70 is preferably located within a greenhouse, the bodies 62 being coated on the inside and the outside with paraffin so that there is no biodegradation by bacteria present in or generated at the root area of the seedling subsequent to germination of the seed itself. The seed is placed within the sterile loam filling each hollow cone body 62 to a predetermined height. During the initial set up, a thin (10 mil) mylar black sheet or film 64 covers the open tops of the cone bodies 62. The color black is employed for a number of reasons, one of which is to keep the UF factor, i.e., ultra-violet rays, off the cone itself, which emanate through the roof of the greenhouse. Six weeks after the black mylar sheets are in place, by use of a razor blade or the like, X slits 66 are placed within the mylar sheets 64 on top of each cone to allow the seed which has germinated to force the leaf portions of the seedling press upwardly through X slits. During the initial process, the circuit mylar 64 maintains the moisture in the soil and allows the germination process to speed up by covering it with the plastic, the plastic creating condensation on the top of the plastic and keeping the total moisture and warmth in the soil.

After the period of about six weeks, when the razor X cuts are applied to the top of the plastic at each cone location, water is dripped through the X slits by an appropriate feeding system which will feed water (with or without nutrients) to the seedlings. Pipe 68 sprays water via nipples 68A and drip tubes 68B which penetrate the mylar sheet 64 with tube end 68C above loam M. If nutrients are employed within the drip water feeding system, the nutrients may have the same formulation as provided by the nutrient sections such as band 18b to accelerate the rate of growth of the seedling within the planting devices 18 during their period of placement within the greenhouse. Thus, the present application includes the concept of acceleration of growth within the greenhouse whereby, the seedlings S reach acceptable size in a shorter period of time than it takes to achieve an acceptable size under conventional growth methods, as by shortening the growth period prior to airborne air drop from six months to four and one-half months. The trays 70 may be 100 feet long or even longer. There is no replanting or transplanting involved in the that the plants are grown from seeds to air drop size seedlings. When they reach the proper size, the hollow cone bodies 62 are simply lifted from the trays and packaged into the transport and dispensing containers or trays 20. Preferably, the same basic nutrient formula is used during the terminating and sprouting period to aid in accelerating the growth cycle, while avoiding root burning and nutrient shock. The seedlings as shown in FIG. 11 are physically packaged in the manner of FIGS. 9 and 10. The filled trays 20 are then deposited within the dispensing containers borne by the aircraft and dropped in the manner discussed previously with respect to FIGS. 1 and 2.

From the above, it is obvious that by dry powder pressure molding through the use of a suitable hydraulic press or the like, each urea-formaldehyde resin body 62 may be sequentially built up of at least two sections with a lower section (in the vicinity of the root area of the seedling) bearing the soil bacteria released nutrients. Actually, all of the sections including the band or section enriched with nutrients, if formed of urea-formaldehyde resin, contain as a minimum approximately twenty percent nitrogen which is released by bacteria action, thereby insuring after air drop the supply of nitrogen as a plant growth supplement to the seedling, even though the site may provide little in the way of food to the plant or air dropped seedlings. The urea-formaldehyde resin preferably contains a certain amount of resin, a certain amount of sulfates, e.g., iron, or magnesium sulfate, calcium carbonate, bentonite, stearates, etc. all of which allow compaction of the powder to the point where it is very brittle. As the planting device 18 impacts the earth, it penetrates and fractures the side walls, particularly in the nutriment enriched area 18B, which permits the root section to grow through the planting device 18 in the area of fracture. As the root sections grow through the body 62, and bacterial action initiates degradation the nutrients are automatically released the provide the life sustaining and support system for the seedling itself.

As noted, the upper body portion or shroud 62B protects the limb structures of the seedling or tree while it is being ejected through the air at velocities up to 160 knots. Further, the shroud 62B aids in gathering moisture. If it rains, the shroud 62B will funnel the moisture to the root sections. Incidentally, the presence of the drain hole 64 permits excess moisture to drain through the base of the body 62, whether it be when the bodies are mounted to the growing tray 70 within the greenhouse, or at the time of partial penetration into the earth body after air drop. It should be appreciated, however, that bodies 62 are not significantly biodegradable solely by exposure to light, and moisture; the degradation takes place primarily as a result of soil bacteria action, particularly that generated near the side root structure as a result of the action of bacteria at the side root area as a result of normal growth.

Additionally, the primary function of the present invention is to provide a planting device wherein the body is soil bacteria biodegradable to supply all of the necessary nitrogen, phosphorus, potash needs to the seedlings for a term up to two years subsequent to air drop planting. Preferably, there is also calcium, sulfur, and iron in the formulation. Favorably, the soil bateria breakdown of the body 62 is accelerated under very warm moist conditions. Thus, over a one or two year feeding span, only a portion of that span is under very hot or warm moist climate conditions. Accelerated supply of the nutrients occurs, therefore, automatically at a time when the plant can best use these nutrients. The nutrients include nitrogen which is 100 percent derived from urea-formaldehyde resin and is released gradually by the activity of the soil bacteria. Thus, great amounts of nutrients are released during the active growing season when the bacterial action is at a peak. Very little nutrient release occurs during the cool, dormant season, when bacterial action is at its lowest. The seedling root masses are in a position to immediately absorb the nutrients released by the bacterial reaction. This invention shows the problem plaquing the industry which has stayed away from water soluble fertilization processes and also from time release systems that are based on water. As one can appreciate, if it starts raining heavily, the rain either washes away all the water soluble fertilizer or it will stay there and, being excessively released, burn the tree rootball during the dormant season when the tree is not growing and incapable of absorbing the nitrogen.

As explained the upper most and bottom sections 18A and 18C of the growing device body 62 may be formed of 100 percent urea-formaldehyde resin, the intermediate section or nutrient band 18B may also be formed of the same urea-formaldehyde resin which is enriched with nutrients.

In terms of the bacterial release of nutrients, the embodiment of FIG. 3 shows three zones or sections, a bottom soil bacteria degradable section 18C of molded ureaform a top molded ureaform material section 18A, and a band of nutrient enriched material 18B interposed between the two bands 18A and C, of nutrient enriched material. In this case, the device can be formed by a three stage powder molding compaction process. First, in a typical process the tip or bottom (band 18C) is formed of urea-formaldehyde resin under an applied compression of about 125-150 tons and a 3-5 second dwell time; a mass of nutrient enriched urea-formaldehyde resin is next placed within the mold and compressed at about 65-75 tons (to form band 18B), and thirdly, additional urea-formaldehyde powder is packed within the remaining mold portion and compressed at about 40 tons (to form band 18A); in each case compaction of the applied powder occurs prior to the placement of the subsequent powder portion to produce the multi-layer or multi-banded effect.

As explained, any suitable water insoluble material which can be formed into the necessary shape having the desired mechanical properties and being degraded by soil bacteria may be used in this invention. The insoluble ureaform resins in powdered or granular form sold under the tradename NITROFORM have been found to be particularly effective.

In preparing preferred cone shape bodies of the type illustrated in the drawings the basic starting material was ureaform 38-0-0 (NITROGEN POWDER BLUE Sprayable Nitrogen 38-0-0) containing approximately 24–28% total available nitrogen in water insoluble form and the balance in a form soluble only in large amounts of water. To prepare the nutrient containing material there was added to the basic ureaform resin phosphoric acid to provide the phosphorus nutrient, potash, to provide potassium, and iron and zinc sulfates to provide iron, zinc and sulfur. It has been found that the additives when purchased commercially generally contain a substantial amount of combined calcium, so the separate addition of calcium may be unnecessary, but if additional calcium is desired, calcium carbonate may be added.

The proportions of materials were selected in a first batch so that spectographic analysis of the urea-formaldehyde resins incorporating nutrients employable in the present invention in the make up of band 18B of planting device body 62 gave the following results.

| Batch No. 1 Spectrographic Analysis | |
|---|---|
| N, P, K-22-8-2 | |
| TOTAL NITROGEN (N) | 22.0% |
| 6.6% WATER SOLUBLE NITROGEN | |
| 15.4% WATER INSOLUBLE NITROGEN | |
| PHOSPHORUS | 8.0% |
| POTASSIUM | 2.0% |
| CALCIUM (Ca) | 3.0% |
| SULFUR (S) | 1.0% |
| IRON (Fe) | 0.5% |
| ZINC (Zn) | 0.1% |
| POTENTIAL BASICITY: | .3% OR 60 LBS. CALCIUM CARBONATES PER TON |

The proportions of ingredients were adjusted in a second batch to provide a composition having the following analysis:

| Batch No. 2 Spectrographic Analysis | |
|---|---|
| N, P, K-18-8-3(+Mg) | |
| TOTAL NITROGEN (N) | 18.0% |
| 5.4% WATER SOLUBLE NITROGEN | |
| 12.6% WATER INSOLUBLE NITROGEN | |
| PHOSPHORUS | 8.0% |
| POTASSIUM | 3.0% |
| CALCIUM (Ca) | 3.0% |
| MAGNESIUM (Mg) (also added as sulfate) | 0.5% |
| SULFUR (S) | 1.5% |
| IRON (Fe) | 0.5% |
| ZINC (Zn) | 0.1% |
| POTENTIAL BASICITY: | 5% OR 100 LBS. CALCIUM CARBONATE PER TON (THIS MATERIAL IS MORE SUITED TO SOILS DEFICIENT IN MAGNESIUM, SUCH AS ARE FOUND IN THE SOUTHEASTERN UNITED STATES). |

With respect to the two batches, each is capable of producing a body which releases nutrients over time when in contact with soil bacteria present in or generated at the root of the body enclosed seedling. Further, for soils deficient in certain metals such as magnesium, the required metals may be readily further added, as desired in requisite amount.

The above batches are aimed primarily at the needs for the evergreen forestation industry. Obviously, if one were to air drop plant flowers, one would desirably include a higher nutrient content.

Applicant has determined that urea-formaldehyde resin also permits the control of pH, provides the desired water insolubility, and is capable of being mixed with various extenders or fillers to produce molding powders.

In addition to supplying the nutrients by soil bacteria degradation of the urea-formaldehyde resin (or its equivalent) body 62, the molded pressed powder body 62 may incorporate an agent which, when released, is taken up through the seedling root system and provides to the seedling a taste or other characteristic rendering it essentially inedible to wild life. It is a known for example that deer generally are repelled by and will not eat a coniferous tree which has been treated with an egg derivative. Therefore, a suitable egg derivative may form a portion of the compositon of body 62, particularly in the area of the root zone, that is, the nutrient enriched band 18B, permitting ready absorption by the side root structure, such that the sap bears a certain amount of egg derivative content in sufficient quantity such that the deer will simply cease grazing on the seedling having this sap component. Sage oil could be added for the same purpose to the nutrient bearing band. Also, an agent to inhibit insect life may be incorporated in body 62 for soil bacteria release to the roots.

Thus, applicant's air drop planting system and planting device readily and easily permit the transplanted plants to be rendered insect and browse-protected.

Referring next to FIG. 4, there is shown a second embodiment of a planting device indicated generally at 18' and bearing a seedling S in similar fashion to the embodiment of FIG. 3. However, in this case, the urea-formaldehyde resin body indicated generally at 62' is a much shorter height cone. It does not have an integral shroud similar to shroud 62B in the embodiment of FIG. 3, but employs as a shroud a removable styrofoam cuff or shroud 80, being of a slightly tapered frustoconical form and bearing an integral collar as at 82. Further, near its base portion, that is, its lower end, the side wall is thickened as at 84 so as to form a friction fit with the exterior of the body 62' near its open upper end, as indicated in dotted lines. Further, the body 62' includes three integral sections in terms of configuration which have no apparent line of demarcation. However, the middle section 18B' contains bacterial action release enriched nutrients, while the upper and lower sections 18A' and 18C' is of non-nutrient enriched biodegradable molded material, preferably 100% urea-formaldehyde resin. A nose cone 60 may be identical to that employed in the embodiment of FIG. 3, and body 62' includes a drain hole 64' in the same manner as the prior embodiment performing the same function.

It may be appreciated in both the embodiments of FIG. 3 and FIG. 4, the nose cone 60 is not installed during germination process in the greenhouse. It may be formed of nylon or formed of urea-formaldehye resin in similar fashion to body 62'. Seedling S is supported by the growing medium M, and again, this medium may be an initially sterile loam. The seedling may be seed grown, and in which case the interior and exterior walls of the body 62' may be initially coated with 10 mils of paraffin as in the embodiment of FIG. 3A. Ideally, both the inner and outer walls of the cone have coatings 63 of a material, such as paraffin, which protects the wall 62 for a desired period of time, e.g., while the seedlings are raised in the greenhouse, and then is itself dissipated, as by bacterial attack to expose wall 62 to bacterial degradation at the proper time.

Turning next to FIG. 5, embodiment 18" a powdered pressure molded urea-formaldehyde resin body 62 identical to that of the FIG. 3 embodiment, is illustrated as bearing no nose cone and receiving a standard industry growing plug. The planting device 18" accommodates a seedling in the form of a grown plug within the interior of the body 62 and initially positioned within a cavity 90 formed centrally of sterile loam material M. Cavity 90 is formed within the loam mass to a predetermined depth. Subsequently, additional sterile loam material is placed within the cavity or the loam material M is simply pushed down over the plug to pack in the seedling.

In the industry, an extruded plastic, e.g., styrofoam tube approximately 25 meters in diameter is severed into one and one-half inch segments 92, and the segments are placed on styrofoam trays. Each of the segments are filled with soil, the soil compacted and thus forming a tiny growing pot. The seed is placed on top of the soil, and the germination process is initiated in the greenhouse at a desired growth period. When the seedling is approximately six to seven inches in height, the plant is lifted with the styrofoam segment 92 in place, since it is basically biodegradable, the plug also containing a certain amount of moisture, and placed within the cavity 90 at or close to the date of desired air drop. Even so, the inner and outer surface of body 62 may be coated with paraffin to a given mil thickness to resist bacteria initiated biodegradation (for several weeks or so) after initial air drop and ground penetration by body 62.

With respect to the embodiments discussed above, it is the shape of the planting device 18, the compounding or varying density of the pressure formed sections of the cone material for the hollow cone body 62 material, the growing medium M density, the nose cone 60 construction, and a sandpaper-like surface provided to the nose cone 60 and its center of gravity which combine to achieve the necessary aerodynamic stability of the planting device. Impact penetration is enhanced by the influence of the downward pattern of air caused by the helicopter blade action. In addition, the random impact pattern is helped by the unpredictable downward pattern of the helicopter air impinging on the terrain. Further scattering effects are influenced by the altitude from which the planting devices are dropped.

Figure 6:
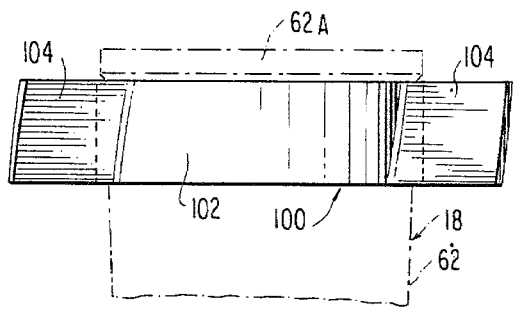
FIG. 6 is a side view of an attachable propelling wing assembly for application to the planting devices of FIGS. 3, 4 and 5.
Figure 7:
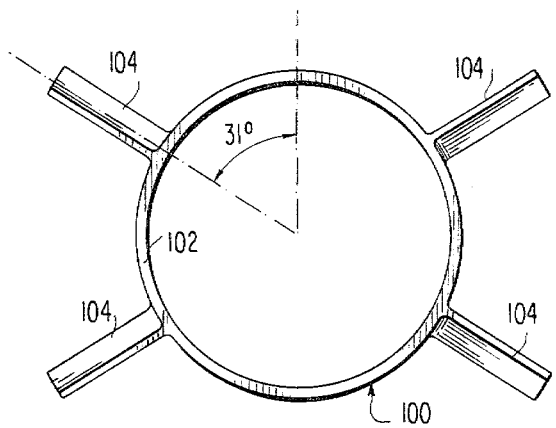
FIG. 7 is a top plan view of the propelling wing assembly of FIG. 6.
Figure 8:
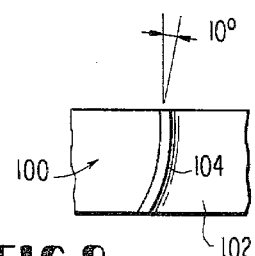
FIG. 8 is a further side view of a portion of the assembly of FIG. 7 showing the angle of inclination of the radial wings integral with the assembly collar.

Referring next to FIGS. 6, 7 and 8, a driver wing element or assembly indicated generally at 100 is shown as constituting essentially a circular band or collar 102 bearing a plurality of radially outwardly projecting air foil or driver wings 104. This permits the velocity of the planting device 18 to be increased, that is, the projectile velocity at the moment of ground entry may be increased appreciably for improved ground penetration, as discussed previously. The assembly 100 forms an attachment to the planting device body and operates on the principle of a driving effect provided by the driver wings 104. The driver wings 104 are provided with a 10 degree pitch, FIG. 8. The wings 104 are of 6 mil thickness in the illustrated embodiment and offset 31 degrees from the center line to left and right to provide a 3.26 BOW reference. Applicant has determined that this produces a 100 percent (2 to 1) multiplier factor. That is, the speed experienced by the falling body is doubled as a result of the application of assembly 100 to the planting device 18. The band or collar 102 is approximately one inch in width, and when the planting device 18 is inserted, the collar fits tightly and provides a frictional fit to the hollow cone body 62. Alternatively, a positive locking system such as a notch cam lock may be employed to secure the wing assembly 100 to the planting device 18. In operation, the rotating motion induced by the propelling wings 104, also creat a gyroscopic stabilizing effect which gives greater assurance that the nose cone 60 or point of the hollow cone body 62 will make contact first with the ground at the time of impact. However, in the design of the planting device 18 absent the attachment 100, the device 18 has inherent projectile characteristics, partially assured by the rough suface provided to the outer surface of body 62 and nose cone (preferably both formed of urea-formaldehyde resin) and of the higher density of that body tip and nose cone due to higher compression pressure on the powder forming those elements or sections.

From the above, it may be seen that by use of the air drop system and the improved seedling planting device, there is greatly improved survival rate and substantially increased growth rate, particularly for transplants of the seedlings on infertile soil. As an example, there will be an average height increase of five to six inches of a fed red pine versus a non-fed transplant at the end of the second season. Assuming further, that it takes 20 years to mature standard lumber by the improved planting system of the present invention, the lumber may get to market within a period of 15 or 16 years and additionally give a higher yield of lumber per acre at a more rapid rate.

As may be appreciated, by the use of the present system, feeding is effected with speed, safety, efficiency and versatility. In terms of safety, the time release of nutrients in the planting system described above involves initial compression of the nutrients under many tons of pressure. The planting cone does not dissolve when subjected to the elements, particularly water. Instead the nutrients are gradually released by the action of the soil bacteria only, and the risk of burning roots is negligible, even in the very worst of climatic conditions. The integral planting system provides eight times the plant needs for nitrogen, 13 times the phosphorus, and 4 times the potassium required, and functions to quadruple the size of the forest seedling during the first year after transplanting. Little of the surplus nutrients are wasted. Most are slowly absorbed by the tree roots. The system permits transplanting in any kind of soil so long as there is sufficient moisture to permit root growth and sufficient soil bacteria to activate the system. The only need is to break down the planting cone body 62 and release the nutrients.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An improved air drop planting device for air drop planting of seedlings or the like, said planting device comprising:
   a hollow air foil body formed of a non-water soluble, soil bacteria biodegradable material,
   said hollow body bearing internally a growing medium and a seedling within said medium and said seedling having its root structure within said medium and its leaf structure rising from the medium at an open end of said hollow body,
   said body comprising at least one life support nutrient for said seedling, said body material comprising compressed ureaform powder, said body taking the shape of an open cone including in sequence from said open end, at least a major cone portion and an integral thickened tip, and wherein at least said tip being of increased density relative to said major cone portion, the outer surface of said compressed powder cone being roughened such that the hollow cone body is inherently aerodynamically stable so as to drop nose first to effect planting of said seedling by earth surface penetration, said planting device further comprising a driving wing assembly, said driving wing assembly including a circular band having an internal diameter on the order of said hollow cone body adjacent its open end, being concentrically mounted to said hollow cone body and bearing a plurality of air foil wings projecting radially from the periphery of the band for imparting rotation to said cone body and increasing the relative velocity of said planting device during air drop, and wherein the pitch of each air foil wing is approximately ten degrees, and said air foil wings are positioned thirty-one degrees to each side of a centerline bisecting said band.

2. The air drop planting device as claimed in claim 1, wherein said body includes an integral band of soil bacteria released enriched nutrients at the side root mass area of said seedling.

3. The air drop planting device as claimed in claim 1, further comprising a high density hollow conical nose cone mounted to the tip portion of said compressed powder body and being of the same material as said body.

4. The air drop planting device as claimed in claim 1, further comprising a hollow frustoconical cuff frictionally mounted to the open end of said hollow cone body and forming a shroud about at least that portion of the leaf structure of the seedling adjacent the top of hollow cone body.

5. An elongated planting device transport and dispensing tray for an air drop planting system for random pattern dropping of hollow cone planting devices bearing internally seedlings within said hollow cone planting devices, said system including a horizontally open ended dispensing container fixedly mounted to an aircraft fuselage and having at least one compartment open to the exterior of the fuselage, and wherein a plurality of said trays are removably, vertical stacked within said compartment, each tray being of rectangular cross-section and having at least one horizontally open end corresponding in position to the open end of the dispensing container, and whereby a plurality of hollow cone planting devices may be slidably mounted in a horizontal row within a dispensing tray with the planting devices alternating their pointing directions such that the planting devices may be movable horizontally within the trays for forced projection of the planting devices from the horizontal open end of the trays to cause a widespread uniform drop of said devices over a significant drop zone swath, and wherein each tray comprises sheet material halves including a bottom half having a bottom wall and an integral end wall and a top half including a top wall and an integral opposite end wall, said halves being pivotably connected along one side thereof, permitting the top half to open with respect to the bottom half, and each of said halves bearing internally projecting ribs on opposite sides and adjacent respective ends, said ribs functioning to locate said planting device hollow cone bodies, and permitting, when said planting devices are placed alternately, end for end within the container bottom half, leaf portions of the seedlings carried therein to project beyond the ribs and within said trays.

* * * * *